June 15, 1948. W. R. TUCKER 2,443,333
ROTARY VALVE ACTUATING DEVICE
Filed May 15, 1943 2 Sheets-Sheet 2
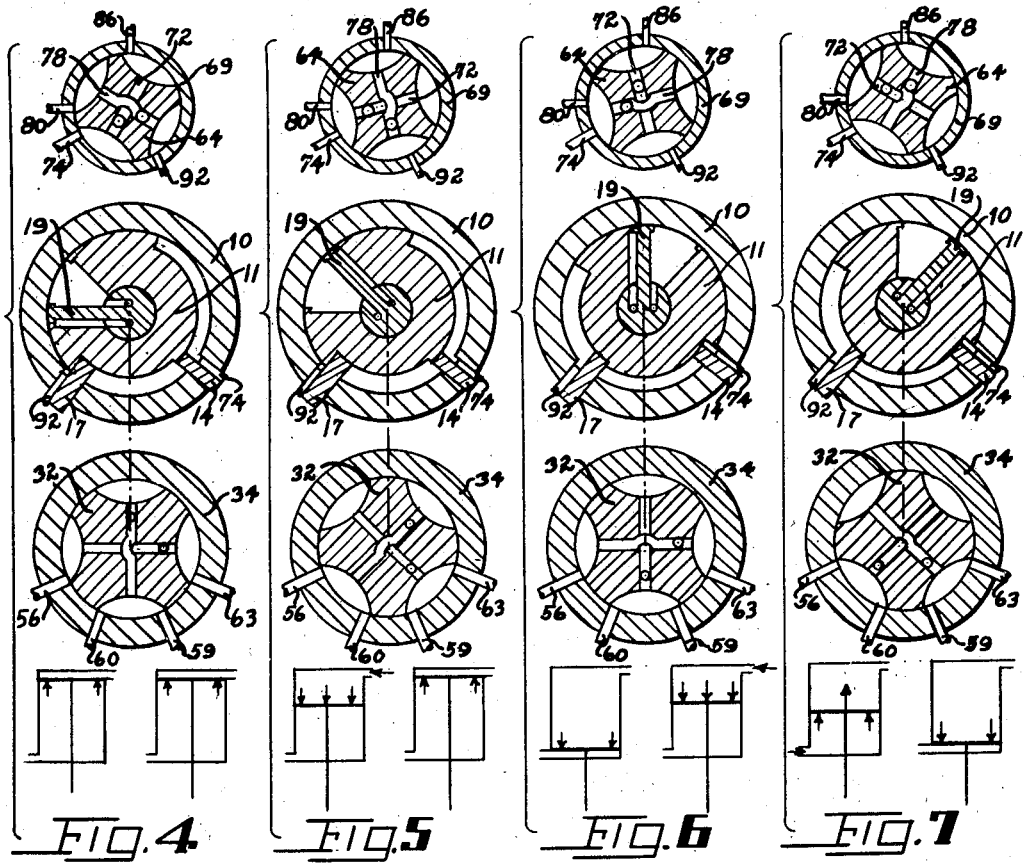
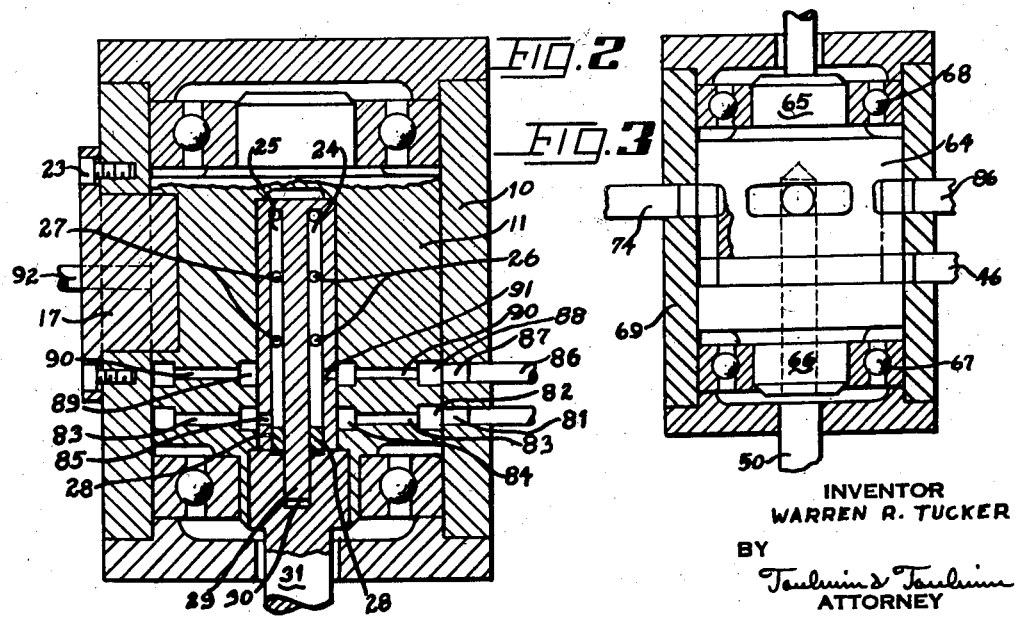
INVENTOR
WARREN R. TUCKER
BY
Toulmin & Toulmin
ATTORNEY Patented June 15, 1948

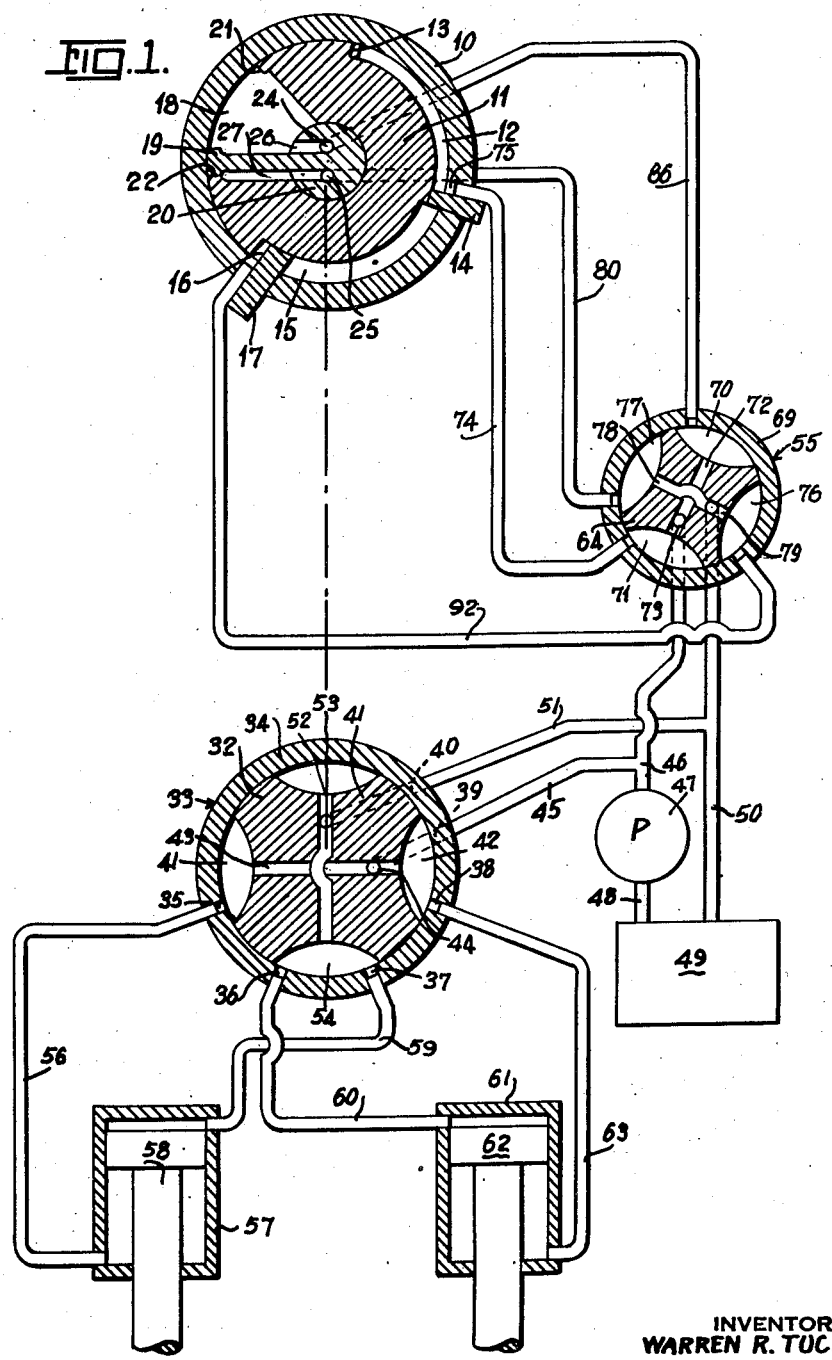

2,443,333

UNITED STATES PATENT OFFICE 2,443,333

ROTARY VALVE ACTUATING DEVICE

Warren R. Tucker, Dayton, Ohio, assignor to H-P-M Development Corporation, a corporation of Delaware Application May 15, 1943, Serial No. 487,119½

6 Claims. (Cl. 121—38)

1

This invention relates to control devices and, in particular, to fluid operable actuating means for a rotary member.

It is an object of this invention to provide a simplified fluid operable control device adapted to be used in connection with a rotary member and to selectively move said rotary member into any one of a plurality of predetermined positions.

It is another object to provide a control device including two rotary fluid operable control members for controlling the movement of a rotary element so as selectively to move the latter into any one of at least three predetermined positions.

Another object of the invention consists in the provision of a control device including two fluid operable rotary members, one of which is adapted to be connected with a rotatable element to be controlled, whereas the other one of said rotary members is movable into a plurality of predetermined positions for limiting the movement of said first mentioned rotary member.

It is still another object to provide a control motor, including a plurality of concentrically arranged fluid operable rotary members, the relative movement of which is hydraulically limited and variable, while one of said rotary members is adapted to control the movement of a rotatable element selectively into any one of a plurality of predetermined positions.

These and other objects and advantages of the invention will appear more clearly from the following specification in connection with the accompanying drawings, in which:

Figure 1 diagrammatically illustrates the control device according to the invention in connection with a rotary valve to be controlled and a pilot valve for controlling the flow of actuating fluid to said control device.

Figure 2 is a longitudinal section through the control device of the present invention.

Figure 3 is a longitudinal section through the pilot valve.

Figures 4, 5, 6 and 7, respectively, illustrate various positions of the control device, the pilot valve and the valve to be controlled and including various operative positions of fluid motors controlled by the valve to be controlled.

Structural arrangement

Referring now to the drawings in detail, and Figures 1 and 2 thereof in particular, the control device shown therein comprises a casing 10 having reciprocably mounted therein a first rotor 11. The control rotor 11 is provided with a recess or passageway 12 having at one end thereof a

2 grooved abutment area 13 for abutment with a stop member 14 arranged in and carried by the control casing 10.

The control rotor 11 furthermore comprises a recess or passageway 15 with a grooved abutment area 16 for abutment with a stop member 17, which, similar to the stop member 14, is carried by and arranged in the control casing 10. The stops 14 and 17 may be connected to the control casing 10 in any desired manner, for instance as shown in Figure 2 with regard to the stop 17 by means of screws 23.

The control rotor 11 is furthermore provided with a V-shaped recess 18 in which is reciprocably mounted a control vane 19, the control shaft 20 of which is journalled in a correspondingly shaped recess in the control rotor 11.

The control vane 19 is adapted selectively to engage the abutting area 21 or the abutting area 22 of the control rotor 11. The control shaft 20 connected to the control vane 19 is provided with longitudinal bores 24 and 25 which respectively communicate with transverse channels 26 and 27. The bores 24 and 25 are plugged at their lower ends by plugs 28. The control shaft 20 has an extension 29 which engages a correspondingly shaped recess 30 of a valve shaft 31. The valve shaft 31 is connected to the rotary valve member 32 of the rotary valve, generally designated 33 and comprising a valve casing 34 with valve ports 35, 36, 37, 38, 39 and 40. A rotary valve member 32 is provided with recesses 41 and 42 which are interconnected through a channel or passageway 43. The passageway 43 is connected through a passageway or channel with the port 39 which latter is connected through conduit 45 with a pressure line 46 communicating with the pressure side of a fluid source such as a pump 47.

The suction side of the pump 47 is connected through a conduit 48 with a fluid reservoir or tank 49. Also connected with the tank 49 is a conduit 50. Branching off from the conduit 50 is a conduit 51 leading to the port 40. The port 40 is connected through a channel or passageway 41 in the rotary valve member 32 with a passageway or channel 52 which latter interconnects the recesses 53 and 54 provided in the rotary valve member 32. The actual construction of the rotary valve 33 is immaterial with regard to the present invention and may be identical to the construction of the pilot valve, generally designated 55 which will be described in detail later.

Communicating with the port 35 is a conduit 56 leading to the lower portion of a cylinder 57 in which is reciprocably mounted a plunger 58. The upper portion of the cylinder 57 is connected through a conduit 59 with the port 37. The port 38 communicates through a conduit 60 with the upper portion of the motor cylinder 61 having a reciprocably mounted therein a plunger 62. The lower portion of the cylinder 61 is connected through a conduit 63 with the port 38.

Referring now to the pilot valve 55, the same comprises a valve rotor 64 with extensions 65 and 66 rotatably mounted in anti-friction bearings 67 and 68. The valve rotor 64 which is rotatable in the valve casing 69 is provided with recesses 70 and 71 interconnected through a passageway or channel 72. The passageway 72 communicates through the passageway or channel 73 with the pressure line 46. The recess 71 furthermore communicates through the conduit 74 with the port 75 in the control casing 10. The valve rotor 64 is furthermore provided with recesses 76 and 77 interconnected through a channel or passageway 78 which latter communicates through a channel or passageway 79 with the exhaust conduit 50.

The recess 77 is connected through a conduit 80 with the port 81 in the control casing 10 which port communicates with an annular recess 82 in the control rotor 11. The annular recess 82 is adapted to communicate through passageway 83 with an annular recess 84 which latter communicates through a bore 85 with the longitudinal bore 25. The recess 70 communicates through a conduit 86 with a port 87 in the control casing 10 which port communicates with an annular channel 88. The channel 88 is in fluid communication with an annular channel 89 through passageway 90. The annular channel 89 is in fluid communication through bore 91 with the longitudinal bore 24 in the control shaft 20.

Operation

It may now be assumed that all parts occupy the position shown in Figure 1 and that it is now desired to cause the plungers 58 and 62 to perform a cycle. To this end, the operator starts the pump 47 and shifts the valve rotor 64 of the pilot valve 55 from Figure 1 position into the position of Figure 5, i. e., by 45°. Pressure fluid delivered by the pump 47 will then pass through conduit or pressure line 46 and passageway 72 into the recess 71 and from there through the conduit 74 into the recess 12 where it will act upon the grooved abutment area 13.

However, inasmuch as the grooved abutment area 16 already abuts the stop member 17, no movement of the rotor 11 is effected but this rotor is merely positively held in its position. Furthermore, pressure fluid from the recess 71 passes through conduit 80, the annular recess 82, the channels or passageway 83, the annular recess 84 and the bore 85 into the bore 25 from where it passes through the transverse channel 27 and acts on the vane 19 so as to move the same from Figure 1 position into Figure 5 position. When the vane 19 abuts the abutting area 21 it comes to a stop.

The thus effected movement of the vane 19 causes a corresponding rotation of the shaft 20, and inasmuch as the latter is connected to the rotary valve member 32, the latter has performed a corresponding movement so that it now occupies the position shown in Figure 5. In this position, pressure fluid delivered by the pump 47 passes through conduits 46 and 45 to the port 39 in the valve casing 34. From here the pressure fluid passes through the channel 44 into the channel 43 and is conveyed in part into the recess 41 and in part into the recess 42. From the recess 42, the fluid passes through conduit 63 into the lower portion of the cylinder 61 where it acts upon the plunger 63 and holds the latter in its upper portion.

Furthermore, fluid passes from the recess 42 through conduit 59 into the upper portion of the cylinder 57 where it acts upon the plunger 58 so as to move the latter downwardly. The fluid expelled from the lower portion of the cylinder 57 during this downward movement escapes through conduit 56 into the recess 54 and from there through the passageways 52 and 41 and the conduit 51 and exhaust conduit 50 into the tank 49. Consequently, movement of the pilot valve 55 in the Figure 5 position causes the plunger 58 to begin its downward movement while the plunger 62 stays in its uppermost position.

The operator may now shift the pilot valve rotor 64 by 90° from Figure 5 into Figure 6 position. As a result thereof, pressure fluid delivered by the pump 47 will pass through conduit 46 into the passageway 72 and from there in part into the conduit 92 and in part into the conduit 86. Fluid conveyed into the conduit 92 acts upon the grooved abutment area 16 and shifts the control rotor 11 from Figure 5 into Figure 6 position where it is stopped since the grooved abutment area 13 engages the stop member 14.

During this movement, the control rotor 11 carries the vane 19 along since the abutment area 22 engages the vane 19. Fluid conveyed through the conduit 86 passes through the bore 24 and the transverse channel 26 and acts upon the vane 19 so as to positively cause the latter to engage the abutment area 22. The vane 19 and the control rotor 11 now occupy the position shown in Figure 6.

In view of the thus described movement of the vane 19, the rotary valve member 32 connected to the shaft 20 has made a corresponding movement and now occupies the position shown in Figure 6. In this position, pressure fluid delivered by the pump 47 passes through conduits 46 and 45 into the channel or passageway 43 and from there in part into the conduit 59 and in part into the conduit 60. The fluid conveyed into the conduit 59 passes into the upper portion of the cylinder 57 where it acts upon the upper portion of the plunger 58 so as to cause the latter to continue its downward movement. The fluid expelled from the cylinder 57 during this downward movement escapes through conduit 56 into the passageway 52 and from there through conduits 51 and 50 into the tank 49.

The fluid conveyed into the conduit 60 enters the upper portion of the cylinder 61 where it acts upon the plunger 62 so as to move the latter downwardly. The fluid expelled from the lower portion of the cylinder 61 during this downward movement escapes through conduit 63 and the passageway 52 into the conduit 51 and from there through the exhaust conduit 50 into the tank 49. Consequently, the movement of the pilot valve 55 into Figure 6 position causes both plungers 58 and 62 to move downwardly.

When the plunger 58 has reached its downward position, or it is desired to reverse the movement of this plunger, the operator shifts the pilot valve 55 in anti-clockwise direction with regard to Figure 1 by 45°, so that it occupies the position shown in Figure 7. In this position, pressure fluid delivered by the pump 47 passes through pressure line 46 into the passageway 72 and from there in part into conduit 92 and in part into the conduit 80. Fluid pressure conveyed into the conduit 92 acts upon the grooved abutment area 16, however, since the grooved abutment area 13 already abuts the stop member 14, no movement of the rotor 11 is effected but the rotor 11 is positively held in its position.

Pressure fluid conveyed into the conduit 80 passes through the bore 25 and the transverse bore 27 so that it acts upon the vane 19 and causes the same to move in clockwise direction until it abuts the abutment area 21. When the vane 19 has reached this position, it comes to a stop. The fluid expelled by the vane during its movement escapes through the channel 26 and the bore 24, through conduit 86 into the passageway 78 and from there through the exhaust conduit 50 into the tank 49.

As a result of this movement of the vane 19, the rotary valve member 32 to be controlled has moved into Figure 7 position. In this position, pressure fluid is delivered by the pump 47 through conduit 46 and conduit 45 into the passageway 43 and from there in part into conduit 56 and in part into conduit 60. The fluid conveyed into conduit 56 enters the lower portion of the cylinder 57 where it acts upon the plunger 58 and moves the latter upwardly since the upper portion of the cylinder 57 is now connected through conduit 59, the passageway 52 and conduits 51 and 50 with the tank 49. The pressure fluid conveyed into the conduit 60 acts upon the upper portion of the plunger 62 so as to cause the latter either to continue its downward movement or to stay in its lower position.

In order to restore the initial position or to complete the cycle, the operator moves the pilot valve 55 from Figure 7 position by 45° in anticlockwise direction. The pilot valve rotor 64 will then occupy the position shown in Figure 4, in which pressure fluid delivered by the pump 47 passes through conduit 46 and the passageway 42 in part into the conduit 86 and in part into the conduit 74. Pressure fluid conveyed into the conduit 74 acts upon the grooved abutment area 13 to thereby shift the control rotor 11 in anti-clockwise direction from Figure 7 into Figure 4 position. The pressure fluid conveyed into the conduit 86 passes through the bore 24 into the transverse bore 26 and here acts upon the vane 19 so as to move the latter in anti-clockwise direction until its abuts the abutment area 22 where it comes to a stop. The vane 19 therefore now occupies the position shown in Figures 1 and 4.

In view of the last mentioned movement of the vane 19, the rotary valve member 32 has moved from Figure 7 position into Figure 1 or Figure 4 position. In this position, pressure fluid delivered by the pump 47 passes through conduit 46 and conduit 45 into the channel 43 and from there in part into the conduit 56 and in part into the conduit 63. The pressure fluid conveyed through conduit 56 into the lower portion of the cylinder 57 causes the plunger 58 to continue its upward movement since the upper portion of the cylinder 57 is connected with the tank 49 through conduit 59, passageway 52 and conduits 51 and 50.

The fluid conveyed into conduit 63 enters the lower portion of the cylinder 61 and acts upon the plunger 62 so as to move the latter downwardly since the upper portion of the cylinder 61 is connected with the tank 49 through conduit 60, the passageway 52 and the conduits 51 and 50. All parts now again occupy their initial position shown in Figures 1 and 4.

While the control valve according to the invention has been described in connection with four different positions, it is of course understood that it need not necessarily be moved through these four positions for a complete cycle. For instance, if the plungers 58 and 62 reciprocate the clamping plunger and the injection plunger of an injection molding machine, the movement of the control valve rotor 11 from Figure 6 into Figure 7 position may be omitted and instead the valve rotor may be moved from Figure 6 into Figure 5 position and thereafter from Figure 5 into Figure 4 position.

If it is desired to actuate the plungers 58 and 62 so that one plunger moves in one direction while the other plunger moves in the opposite direction, the control rotor 11 may be alternately moved from Figure 5 into Figure 7 position and vice versa.

While the present invention has been described in connection with a rotary valve, it will be clear that it may be used in connection with any rotary member to be controlled as for instance a switch member.

It is of course understood that the present invention is by no means limited to the particular structure shown in the drawings, but also embraces any modifications within the scope of the appended claims.

Having thus fully described and ascertained the nature of my said invention, what I claim as new and desire to secure by Letters Patent is:

1. In combination in a control device, a stationary casing, spaced stop elements connected to said casing, a first control member rotatably mounted in said casing and movable through a predetermined angle corresponding to the distance between said stop elements, fluid operable means associated with said control member for actuating the same, a second control member arranged within said casing and rotatable through a predetermined angle, abutment means associated with said first control member for determining said predetermined angle of movement of said second control member, and fluid operable means associated with said second control member for actuating the same.

2. In combination in a control device, a casing, a first fluid operable rotatable control member mounted in said casing, spaced stop means associated with said casing for limiting the rotation of said control member to a predetermined angle, a second control member arranged within said first control member, vane means associated with said second control member and operable in response to fluid pressure acting thereupon for reciprocating said second control member relative to said first control member, and spaced stop means associated with said first control member for limiting the rotation of said second control member to a predetermined angle.

3. In combination in a control device, a stationary casing comprising two spaced stop means, a first rotary member having two stepped segmental recesses adjacent the periphery thereof, one of said recesses cooperating with one of said stop means while the other one of said recesses cooperates with the other stop means, means for admitting pressure fluid selectively into either one of said recesses to bring about a rotative movement of said rotary member, a second rotary member rotatable within said first rotary member and including means for connection with a rotatable element to be controlled, fluid operable means associated with said second rotary member for actuating the same, and means associated with said first rotary member for limiting the movement of said second rotary member.

4. In combination in a control device, a casing provided with a plurality of ports for selectively admitting fluid to and allowing the flow of fluid from said casing, a first fluid operable control member rotatably mounted in said casing, said control member being provided with a plurality of spaced annular recesses at the outer periphery thereof, said rotary member also being provided with an axial bore, a plurality of annular passageways at the periphery of said bore and hydraulically connected with the annular recesses on the outer periphery of said rotary member, a second fluid operable rotary member rotatably mounted in said bore, means for preventing movement of said second rotary member beyond a predetermined angle relative to said first rotary member, and means for limiting the rotary movement of said first rotary member in said casing.

5. In a control device, a plurality of relatively rotatable control elements telescopically arranged and including a casing, means associated with each pair of adjacent elements for limiting the relative movements thereof, chamber means formed by adjacent elements for receiving pressure fluid for actuating said elements, and means for supplying actuating fluid selectively to said chambers.

6. In a control device, a plurality of relatively rotatable control elements telescopically arranged and including a casing, means associated with each pair of adjacent elements for limiting the relative movements thereof, and means for actuating each of said elements so as to move the same together with the other of said elements arranged within said actuated element but independently of the other of said elements arranged around said actuated element.

WARREN R. TUCKER.

REFERENCES CITED

The following references are of record in the file of this patent:

UNITED STATES PATENTS

| Number | Name | Date |
|---|---|---|
| 691,692 | Zweigbergk | Jan. 21, 1902 |
| 2,197,867 | Klement | Apr. 23, 1940 |

FOREIGN PATENTS

| Number | Country | Date |
|---|---|---|
| 73,412 | Switzerland | Oct. 2, 1916 |
| 430,801 | Germany | June 25, 1926 |